United States Patent
Smiljanovski et al.

(10) Patent No.: US 9,951,682 B2
(45) Date of Patent: Apr. 24, 2018

(54) COMPRESSOR AND MOTOR VEHICLE

(71) Applicant: Ford Global Technologies, LLC, Dearborn, MI (US)

(72) Inventors: Vanco Smiljanovski, Bedburg (DE); Helmut Matthias Kindl, Aachen (DE); Joerg Kemmerling, Monschau (DE); Frank Kraemer, Neunkirchen-Seelscheid (DE); Franz J. Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 15/094,741

(22) Filed: Apr. 8, 2016

(65) Prior Publication Data

US 2016/0312690 A1 Oct. 27, 2016

(30) Foreign Application Priority Data

Apr. 22, 2015 (DE) .................. 10 2015 207 341

(51) Int. Cl.
*F02B 33/44* (2006.01)
*F04B 3/00* (2006.01)
(Continued)

(52) U.S. Cl.
CPC .............. *F02B 39/10* (2013.01); *F02B 33/40* (2013.01); *F02B 37/04* (2013.01); *F02B 37/10* (2013.01);
(Continued)

(58) Field of Classification Search
CPC .......... F02B 37/10; F02B 33/40; F02B 37/04; F02B 39/005; F02M 35/10157;
(Continued)

(56) References Cited

U.S. PATENT DOCUMENTS 3,005,117 A * 10/1961 Buchhold ................ H02K 7/09
310/90.5
5,121,605 A * 6/1992 Oda ........................ F02B 39/10
60/608

(Continued)

FOREIGN PATENT DOCUMENTS

DE         10005246 C1    10/2001
DE       102012000512 A1    3/2013

(Continued)

OTHER PUBLICATIONS

A machine translation reference to Buchi et al. (Pub. No. DE 100 05 246 C1), pubhished on Oct. 18, 2001.*

*Primary Examiner* — Thai Ba Trieu
(74) *Attorney, Agent, or Firm* — Julia Voutyras; McCoy Russell LLP (57) ABSTRACT

A compressor for an internal combustion engine is provided. The compressor includes a compressor shaft having compressor blades attached thereto, positioned in an intake air duct, and rotating about an axis during compressor operation and a magnetic bearing positioned upstream of the compressor blades in the intake air duct, including a ring positioned around the compressor shaft, stator electrics arranged in the ring, and at least two magnets arranged on the compressor shaft configured to exert a magnetic force on the stator electrics to form an air gap between the ring and the compressor shaft.

18 Claims, 4 Drawing Sheets

(51) Int. Cl.

| | | |
|---|---|---|
| *F04B 5/00* | (2006.01) | |
| *F04B 35/04* | (2006.01) | |
| *H02K 9/00* | (2006.01) | |
| *H02K 7/09* | (2006.01) | |
| *H02K 21/12* | (2006.01) | |
| *F02B 39/10* | (2006.01) | |
| *F02B 37/04* | (2006.01) | |
| *F02B 33/40* | (2006.01) | |
| *F02M 35/10* | (2006.01) | |
| *F02B 37/10* | (2006.01) | |
| *F02B 39/00* | (2006.01) | |
| *F04D 25/06* | (2006.01) | |
| *F04D 29/058* | (2006.01) | |
| *H02K 21/14* | (2006.01) | |
| *F04D 25/02* | (2006.01) | |

(52) U.S. Cl.
CPC ..... *F02B 39/005* (2013.01); *F02M 35/10157* (2013.01); *F04D 25/024* (2013.01); *F04D 25/0606* (2013.01); *F04D 29/058* (2013.01); *H02K 7/09* (2013.01); *H02K 21/14* (2013.01); *Y02T 10/144* (2013.01)

(58) Field of Classification Search
CPC .. F04D 25/024; F04D 25/0606; F04D 29/058; H02K 7/09; H02K 21/14
USPC ......... 60/607–608; 417/244, 44.1, 353, 251; 310/156.01, 90.5, 156.28, 89, 58
See application file for complete search history.

(56) References Cited

U.S. PATENT DOCUMENTS

| | | | | |
|---|---|---|---|---|
| 5,771,695 A * | 6/1998 | Halimi | ..................... | F02B 39/10 60/608 |
| 6,194,800 B1 * | 2/2001 | Maruyama | ............ | F04D 19/048 310/90.5 |
| 6,255,752 B1 * | 7/2001 | Werner | ................. | F04D 29/048 310/90.5 |
| 6,305,169 B1 * | 10/2001 | Mallof | .................... | F02B 39/10 60/608 |
| 6,390,789 B1 * | 5/2002 | Grob | .................... | F04D 25/0606 417/251 |
| 6,735,945 B1 * | 5/2004 | Hall | ........................ | F02B 39/10 60/608 |
| 6,739,845 B2 * | 5/2004 | Woollenweber | ........ | F02B 37/10 60/608 |
| 7,327,055 B2 * | 2/2008 | Devine | .................. | H02K 1/278 310/58 |
| 7,629,715 B1 * | 12/2009 | Sortore | .................... | H02K 5/20 310/89 |
| 7,830,058 B2 * | 11/2010 | Maeda | .................. | H02K 1/2733 310/156.28 |
| 8,072,104 B2 * | 12/2011 | Kořista | .................... | H02K 7/09 310/90.5 |
| 8,257,059 B2 * | 9/2012 | Cho | .................... | F04D 25/0606 417/353 |
| 9,624,934 B2 * | 4/2017 | Parker | .................... | F04D 25/024 |
| 2007/0029803 A1 | 2/2007 | Randall | | |
| 2009/0261673 A1 * | 10/2009 | Kořista | .................... | H02K 7/09 310/90.5 |
| 2010/0231076 A1 * | 9/2010 | Chiba | ...................... | H02K 7/09 310/90.5 |
| 2011/0038737 A1 * | 2/2011 | Conry | .................... | F04D 25/02 417/244 |
| 2013/0239568 A1 * | 9/2013 | Krishnan | ................. | F02B 37/12 60/608 |
| 2013/0343927 A1 * | 12/2013 | Ramdane | .............. | F04D 29/051 417/365 |
| 2014/0199179 A1 * | 7/2014 | Da Silva | ................. | F04D 29/058 417/44.1 |
| 2015/0104335 A1 * | 4/2015 | Faller | .................. | F04D 29/5806 417/244 |
| 2015/0145365 A1 * | 5/2015 | Fujii | ....................... | H02K 1/276 310/156.01 |

FOREIGN PATENT DOCUMENTS

| | | | |
|---|---|---|---|
| DE | 102013203042 A1 | 10/2013 | |
| EP | 2390511 A1 * | 11/2011 | ........... F04D 29/048 |
| GB | 2381045 A | 4/2003 | |
| JP | 2010119264 A * | 5/2010 | |
| KR | 2001010866 A * | 2/2001 | |

\* cited by examiner

COMPRESSOR AND MOTOR VEHICLE

CROSS-REFERENCE TO RELATED APPLICATION

This application claims priority to German Patent Application No. 102015207341.6, filed Apr. 22, 2015, the entire contents of which are hereby incorporated by reference for all purposes.

BACKGROUND/SUMMARY

Turbochargers are used in internal combustion engines to increase combustion efficiency and/or engine power output. Therefore, boosting an engine via a turbocharger enables engine power and efficiency to be increased or enables the engine to be downsized while providing the power output of a larger naturally aspirated engine. Bearing are used in turbochargers to facilitate rotation of a shaft attached to turbine and compressor blades. For example, DE 102013203042 A1 shows a turbocharger for an internal combustion engine, with an oil-lubricated bearing, a supply line for the oil and a flow limiter for the oil. This type of oil bearing has power losses resulting from friction in the bearing. Heat is also an unwanted byproduct of the bearing friction. The power losses and heat generation both serve to decrease turbocharger performance.

To address at least some of the aforementioned problems, a compressor for an internal combustion engine is provided. The compressor includes a compressor shaft having compressor blades attached thereto, positioned in an intake air duct, and rotating about an axis during compressor operation and a magnetic bearing positioned upstream of the compressor blades in the intake air duct, including a ring positioned around the compressor shaft, stator electrics arranged in the ring, and at least two magnets arranged on the compressor shaft configured to exert a magnetic force on the stator electrics to form an air gap between the ring and the compressor shaft.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to a magnetically supported compressor for an internal combustion engine. The present description also relates to a motor vehicle with an internal combustion engine and a compressor. The features of the compressor described herein decrease frictional losses in the compressor while providing cooling to a bearing in the compressor.

In one example, a compressor in an internal combustion engine of a vehicle is provided. The compressor includes a compressor shaft having compressor blades attached thereto. The compressor shaft is rotatably mounted to an intake air duct and is configured to rotate about an axis of rotation. The compressor also includes a magnetic bearing arranged upstream of the compressor blades. The magnetic bearing includes a ring which engages around the compressor shaft in a contact-free manner. Thus, there is an air gap between the ring and the compressor shaft. The magnetic bearing also includes stator electrics arranged in the ring and at least two magnets arranged on the compressor shaft. The magnetic bearing may be configured to enable the compressor shaft to rotate while and air gap is formed between magnets in the shaft and stator electrics in the intake air duct. Thus the bearing may mount the compressor shaft with a magnetic force. A contact-free and very low-loss mounting of the compressor shaft is thus provided. An integration of the magnetic bearing with the depicted configuration into other compressor types has also been contemplated.

Supporting the compressor shaft with a magnetic bearing enables losses in the bearing to be decreased thereby increasing the speed of the compressor, when compared to previous roller type bearings used in turbochargers. Additionally, positioning the bearing in the intake of the compressor enables the bearing to be cooled via intake airflow. In this way, both compressor and bearing operation can be improved. Moreover, providing a magnetic bearing that enables shaft rotation in a contact-free manner increases the longevity of the compressor.

In one advantageous example, the ring may be retained by at least one strut in the intake air duct. In particular, the strut may have a drop-shaped cross-section. The pressure loss of the air flow can be advantageously reduced in particular with the drop-shaped configuration of the strut since the at least one strut is formed to have low air resistance.

In another example, a supply line for the stator electrics is arranged within the strut of the compressor. The supply line is thus arranged in a space-saving (e.g., compact) manner and has low air resistance.

In yet another example, the magnetic bearing is formed as an electric motor. Here, the compressor shaft can be simultaneously connected to a turbine shaft of an exhaust gas turbine in a torque-transmitting manner, if desired.

The compressor shaft can be driven with the formation of the magnetic bearing as an electric motor. Driving the compressor via the magnetic bearing can be carried out according to a predetermined control strategy via a controller. The exhaust gas turbine represents an energetically expedient drive possibility for the compressor shaft. In combination with the bearing, formed as an electric motor, the response characteristics of the compressor can be improved since the prevailing exhaust gas pressure does not always enable the compressor to deliver boost to the engine in a desired time period and/or enable a desired amount of boost to be generated in the engine. Therefore, the magnetic bearing may be used to drive the compressor when the turbine is not providing a desired rotational input. For instance, the magnetic bearing may be used to drive the compressor to decrease turbocharger lag caused by slow throttle response. In yet another example, the magnetic bearing may be used to drive the compressor in tandem with the turbine during periods of high torque demand to increase engine power output. Further in another example, the magnetic bearing may be used as the sole input to drive the compressor.

It will be appreciated that the magnetic bearing can be cooled via uncompressed intake airflow entering the compressor. As a result, the bearing can in particular be operated as an electric motor with a higher output due to the cooling achieved by positioning the bearing in the intake of the compressor, if desired.

It will be appreciated that the compressor can be included in an internal combustion engine of a motor vehicle. The motor vehicle can include a supply air branch in which the compressor is arranged. The advantages of the compressor thus benefit the motor vehicle. As a result of the compressor described herein, the motor vehicle possesses a more efficient drive with improved response characteristics.

Figure 1:
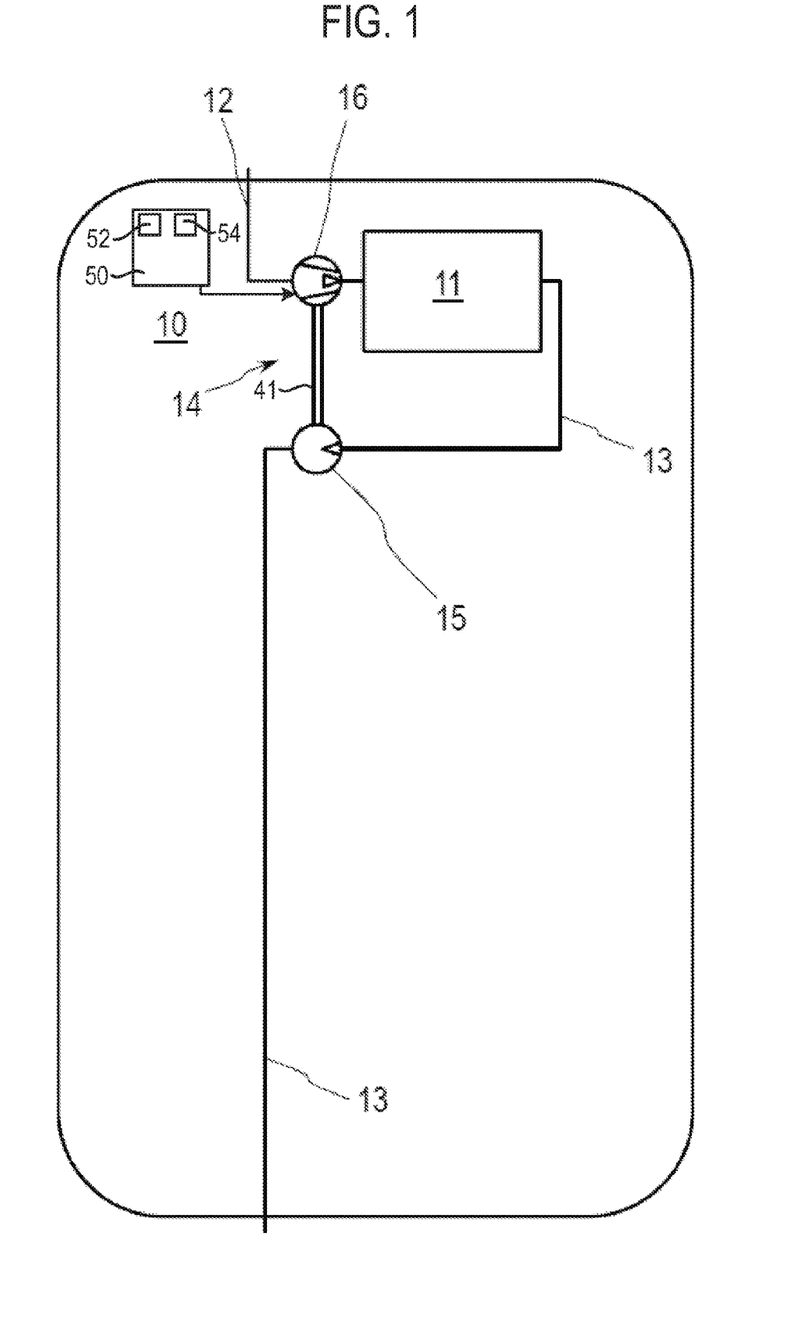
FIG. 1 shows a motor vehicle in an exemplary configuration.

Motor vehicle 10 is represented schematically in an exemplary configuration in FIG. 1. Motor vehicle 10 has an internal combustion engine 11. Motor vehicle 10 furthermore has a supply air branch 12 which is formed to supply air 24 (e.g., intake air), shown in FIG. 2, to internal combustion engine 11 for its operation. Continuing with FIG. 1, motor vehicle 10 has an exhaust gas branch 13 in order to discharge an exhaust gas which is generated during operation of internal combustion engine 11.

Motor vehicle 10 includes a compressor 16 arranged in supply air branch 12. Compressor 16 may be part of an exhaust gas turbocharger 14 and is connected to an exhaust gas turbine 15 arranged in exhaust gas branch 13 in a torque-transmitting manner. It is represented in this manner in FIG. 1. In particular, a compressor shaft of compressor 16 is connected to a turbine shaft of exhaust gas turbine 15 in a torque-transmitting manner. The compressor shaft and the turbine shaft are formed from a single turbocharger shaft 41, in the illustrated example. However, in other examples the compressor may be included in a supercharger receiving mechanically driven input from the engine crankshaft and/or may be electrically driven.

Figure 2:
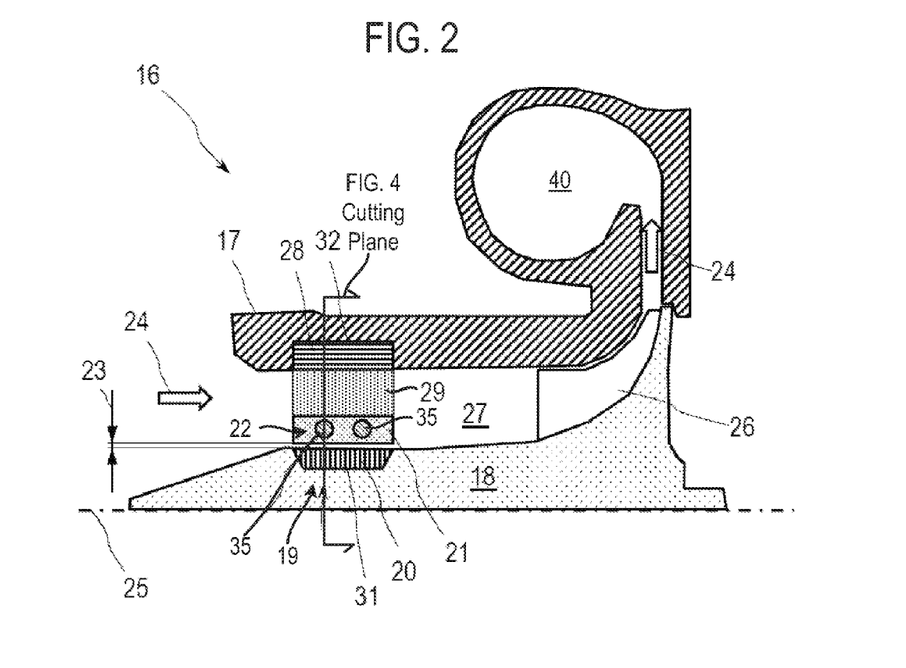
FIG. 2 shows a compressor included in the motor vehicle shown in FIG. 1 in an exemplary configuration in a side view.
Figure 4:
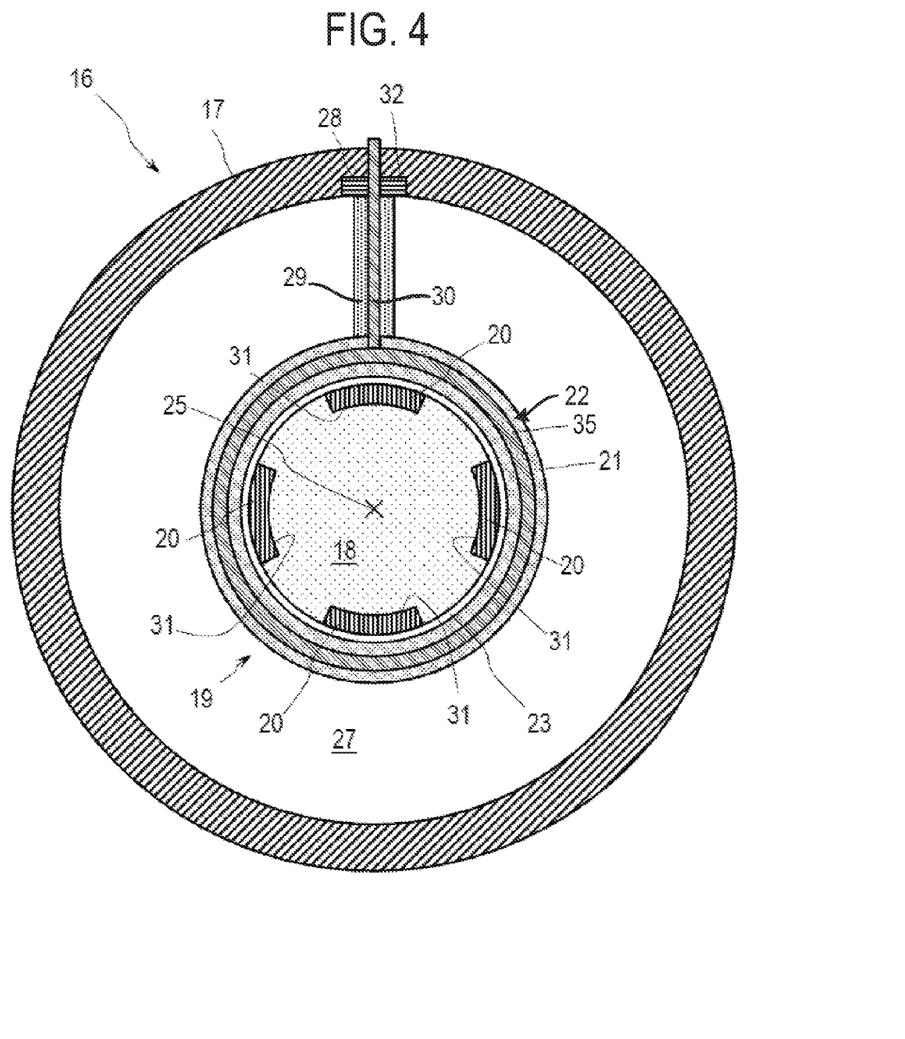
FIG. 4 shows the compressor in a cross-sectional view.

Compressor 16 is represented in FIGS. 2 and 4 in an exemplary configuration. Compressor 16 has a housing 17 in which an intake air duct 27 is formed. Compressor shaft 18 is arranged at least partially in intake air duct 27. Compressor shaft 18 is rotatably mounted in the intake air duct 27 and therefore rotates about an axis of rotation 25. Compressor shaft 18 is provided with several compressor blades 26 which are arranged in at least one row of blades. That is to say that the compressor blades 26 are attached to the compressor shaft 18. Compressor 16 is formed to convey air 24 through intake air duct 27 by rotation of compressor shaft 18. Air 24 flows upstream of compressor blades 26 substantially axially to axis of rotation 25. At the location of compressor blades 26, air 24 is then conveyed in a direction radially to axis of rotation 25. Compressor 16 is therefore a radial compressor. Air flows from the compressor blades 26 into a compressor volute 40. Additionally, as discussed above, the compressor shaft 18 may be connected to a turbine shaft of the exhaust gas turbine 15, shown in FIG. 1, such that torque is transmitted from the turbine shaft to the compressor shaft.

Compressor 16 has at least one magnetic bearing 19 which is arranged in particular upstream of compressor blades 26. Air 24 flowing through intake air duct 27 can thus act in a temperature-regulating manner on magnetic bearing 19. The magnetic bearing 19 may be formed to mount compressor shaft 18 with magnetic force, in one example. That is to say, that the compressor shaft 18 may be rotatably supported via the magnetic bearing 19.

Magnetic bearing 19 includes a ring 21, stator electrics 22, and at least two magnets 20. The stator electrics 22 may include wires 35. The wires 35 may extend around (e.g., circumferentially surround) the ring 21. The wires may be wound into coils, in one example. However, numerous stator configurations have been contemplated. Ring 21 is arranged around compressor shaft 18, coaxially to compressor shaft 18. Thus, the ring 21 surrounds the compressor shaft 18. Additionally, the ring 21 encloses the wires 35 in the stator electrics 22. Thus, the wires 35 are integrally formed with the ring 21. The ring 21 may have a circular or oval geometry, in one example. However, other ring geometries have been contemplated. An air gap 23 is formed between compressor shaft 18 and ring 21 so that ring 21 does not contact compressor shaft 18. In this way, friction losses in the magnetic bearing can be reduced (e.g., substantially eliminated). The air gap 23 is created by the magnetic fields generated within the magnetic bearing 19, described in greater detail herein. Thus, the compressor shaft 18 is enabled to freely rotate via magnetic levitation.

Stator electrics 22 are arranged in ring 21. The at least two magnets 20 are arranged rotationally symmetrically on compressor shaft 18. In particular, magnets 20 are accommodated respectively in a magnet recess 31 of compressor shaft 18. It is represented in this manner in FIGS. 2 and 4, by way of example, four magnets 20 being arranged on compressor shaft 18. However, an alternate number of magnets may be used in other examples such as two magnets, eight magnets, etc.

Air gap 23 runs between magnets 20 and ring 21. As a result of the arrangement of magnets 20 in magnet recesses 31, air gap 23 between compressor shaft 18 and ring 21 can be reduced (e.g., minimized, if desired). Magnets 20 may be permanent magnets, in one example. However in other examples, the magnets 20 may be electromagnets.

Stator electrics 22 are represented in a simplified form in FIGS. 2 and 4. In one example, stator electrics 22 are formed to generate at least one magnetic field which is homopolar with the magnetic field acting radially to the outside at least of one of magnets 20 so that magnetic force, in the case of which stator electrics 22 and magnets 20 repel one another, is formed between stator electrics 22 and magnets 20. In this way, the air gap can be formed in the bearing via magnetic forces.

In one particular example, stator electrics 22 may be formed to generate a magnetic field which rotates about axis of rotation 25 and acts in such a manner on magnets 20 positioned on compressor shaft 18 that torques the compressor shaft 18 and causes the shaft 18 to rotate at a greater speed. In this way, the magnetic bearing 19 may function to enable the compressor shaft to rotate and may also function to drive the compressor shaft, providing dual-use functionality. In such an example, magnetic bearing 19 is configured as an electric motor (e.g., step motor). Here, ring 21 and stator electrics 22 act as a stator and compressor shaft 18 and magnets 20 positioned therein act as a rotor. In such an example, the magnetic bearing 19 and specifically the stator electrics 22 may be electrically driven to apply torque to the compressor shaft 18 to rotate the compressor shaft 18 and therefore compressor blades 26. In this way, the compressor can provide increased engine boost. In such an example, the wires 35 in the stator electrics 22 may be wound as coils to enable electrical energy to be converted into mechanical energy (e.g., torque) in the magnetic bearing 19. When the magnetic bearing 19 acts as an electric motor, torque may be applied to the compressor shaft 18 via the magnetic bearing 19 while torque is transferred from the turbine shaft. However in other examples, the magnetic bearing 19 may provide torque to the compressor shaft 18 when the turbine shaft is not rotating. In yet another example, the magnetic bearing 19 may be the only component applying torque to the compressor shaft 18 when the engine does not include a turbine. The magnetic bearing 19 may apply torque to the compressor shaft 18 when engine speed is below a threshold value, during engine transitional period (e.g., changes in engine speed, changes in engine throttling, etc.). In this way, turbocharger lag can be reduced and the boost provided to the engine can be increased to enable the engine to achieve a desired power output.

Ring 21 is fastened to at least one strut 29. In example depicted in FIGS. 2 and 4, ring 21 is fastened to one strut 29. However, an alternate number of struts may be used in other examples. For example, the magnetic bearing 19 may include two or more struts.

Figure 3:
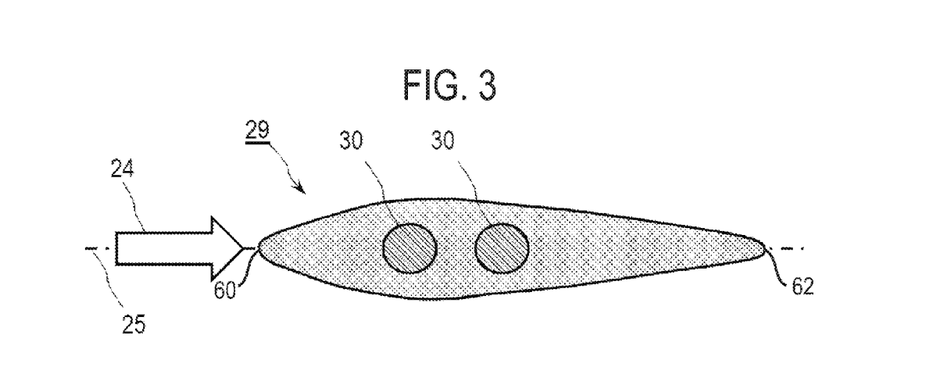
FIG. 3 shows a strut of the compressor.

The at least one strut 29 is connected at one end to ring 21 and at the other end to housing 17. Thus, the strut 29 is coupled to the ring as well as housing 17. In this way, the ring 21 can be supported. Strut 29 has, for example, a base 28 which is fastened in a base recess 32 in housing 17. Strut 29 may have a form with low air resistance at least in the part projecting into intake air duct 27. Strut 29 may be provided with a drop-shaped cross-section. It is represented in this manner in FIG. 3. For instance, an upstream side 60 of the strut 29 is curved (e.g., convex) and a downstream side 62 of the strut is also curved (e.g., convex). The strut 29 also tapers in a downstream direction. These geometric features enable a reduction in losses in the airflow in the compressor 16. However, struts with alternate geometries have been contemplated.

A supply line 30 (e.g., electric conduits) for stator electrics 22 may extend within strut 29. Stator electrics 22 are connected via supply line 30 to a controller 50, shown in FIG. 1, which switches stator electrics 22. The controller 50 is configured to electrically drive the stator electrics 22 to provide magnetic repelling forces between the stator electrics 22 and the magnets 20. In this way, the air gap 23 is generated to reduce resistance in the magnetic bearing 19. Further in one example, the controller 50 may be configured to drive the stator electrics 22 to apply torque to the compressor shaft 18. In this configuration the magnetic bearing 19 acts as an electric motor. The stator electrics 22 may be driven in this way when the engine is below a threshold speed, to reduce turbocharger lag, to increase engine boost, etc. Specifically in one example, the stator electrics 22 may be driven in this way to further increase boost during selected time intervals when increased engine power output is desirable. The controller 50 may include instructions stored in memory 52 executable by a processor 54 to implement the methods, techniques, etc., described herein.

Figure 5:
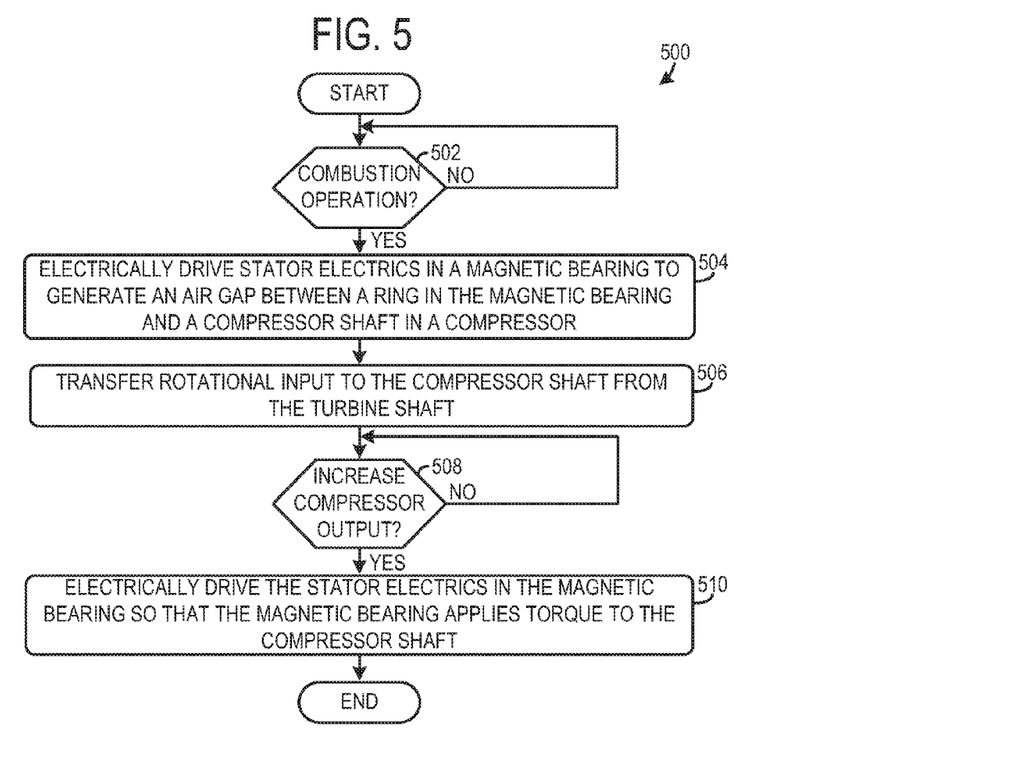
FIG. 5 shows a method for operation of an engine and compressor.

FIG. 5 shows a method 500 for operation of an engine having a compressor. The method may be implemented via the engine and compressor described above with regard to FIGS. 1-4 or may be implemented via another suitable engine and compressor.

At 502 the method includes determining if combustion operation is occurring or anticipated to occur in an engine. For example, a key-on event may be detected, triggering anticipation of combustion operation.

If it is determined that combustion operation is not occurring or is not anticipated to occur (NO at 502) the method returns to 502 (and does not electrically driving stator electrics in a magnetic bearing to generate an air gap between a ring in the magnetic bearing and a compressor shaft in a compressor). However, if it is determined that combustion operation is occurring or anticipated to occur (YES at 502) the method advances to 504. At 504 the method includes electrically driving stator electrics in a magnetic bearing to generate an air gap between a ring in the magnetic bearing and a compressor shaft in a compressor.

At 506 the method includes transferring rotational input to the compressor shaft from the turbine shaft. In this way, the turbine can provide rotational input to the compressor to increase boost in the engine. However, it will be appreciated that step 506 may be omitted when the engine does not includes a turbine, such as in the case of a supercharged engine.

Next at 508 the method includes determining if the compressor output (e.g., boost) should be increased. The increase in compressor output determination may be based on engine speed, throttle position, engine temperature, requested engine output, etc. For instance, it may be determined that the compressor output should be increased when the engine speed is below a threshold value. However, numerous suitable techniques may be used to determine when it is desirable to increase compressor output. If it is determined that the compressor output should not be increased (NO at 508) the method returns to 508 (and does not electrically drive the stator electrics in the magnetic bearing so that the magnetic bearing applies torque to the compressor shaft). However in other examples, the method may return to 502. If it is determined that the compressor output should be increased (YES at 508) the method advances to 510.

At 510 the method includes electrically driving the stator electrics in the magnetic bearing so that the magnetic bearing applies torque to the compressor shaft. For instance, a controller in the engine may command the stator electrics in the magnetic bearing to be electrically driven via energy source (i.e., battery, alternator, etc.,) so that the compressor blades are torqued to provide increase boost to the engine. It will be appreciated that steps 508-510 may only be implemented when the magnetic bearing is configured to operate as an electric motor. Furthermore, electrically driving the stator electrics so that the magnetic bearing applies torque to the compressor shaft may be implemented in tandem with step 504, in one example. That is to say, when the magnetic bearing is configured as an electric motor the functions of rotational supporting the compressor shaft and torqueing the compressor shaft may be performed together as a single function. In such an example, step 508 may be implemented directly after steps 502.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The subject matter of the present disclosure is further described in the following paragraphs. According to one aspect, a compressor for an internal combustion engine is provided. The compressor includes a compressor shaft which is provided with compressor blades positioned in an intake air duct, the compressor shaft and compressor blades configured to rotate about an axis of rotation and a magnetic bearing positioned upstream of the compressor blades in the intake air duct, the magnetic bearing including a ring positioned around the compressor shaft with an air gap between the ring and the compressor shaft, stator electrics arranged in the ring, and at least two magnets mounted on the compressor shaft, the at least two magnets configured to exert a magnetic force on the stator electrics.

According to another aspect, a motor vehicle is provided. The motor vehicle includes an internal combustion engine, a supply air branch providing intake air to the internal combustion engine, and a compressor arranged in the supply air branch, the compressor including a compressor shaft which is provided with compressor blades positioned in an intake air duct, the compressor shaft and compressor blades configured to rotate about an axis of rotation and a magnetic bearing positioned upstream of the compressor blades in the intake air duct, the magnetic bearing including a ring positioned around the compressor shaft with an air gap between the ring and the compressor shaft, stator electrics arranged in the ring, and at least two magnets mounted on the compressor shaft, the at least two magnets configured to exert a magnetic force on the stator electrics.

According to another aspect, a compressor is provided. The compressor includes a compressor shaft having compressor blades and positioned in an intake air duct and a magnetic bearing positioned upstream of the compressor blades in the duct, including a ring positioned around the compressor shaft, stator electrics arranged in the ring, and at least two magnets arranged on the compressor shaft configured to exert a magnetic force on the stator electrics to form an air gap between the ring and the compressor shaft.

In any of the aspects described herein or combinations of the aspects, the ring may be retained by at least one strut in the intake air duct.

In any of the aspects described herein or combinations of the aspects, a supply line for the stator electrics may be arranged within the at least one strut.

In any of the aspects described herein or combinations of the aspects, the at least one strut may have a drop-shaped cross-section.

In any of the aspects described herein or combinations of the aspects, the compressor shaft may be connected to a turbine shaft of an exhaust gas turbine such that torque is transmitted from the turbine shaft to the compressor shaft.

In any of the aspects described herein or combinations of the aspects, the at least two magnets and the stator electrics may be configured to repel one another via magnetic forces.

In any of the aspects described herein or combinations of the aspects, the magnetic bearing may be formed as an electric motor.

In any of the aspects described herein or combinations of the aspects, the stator electrics may include wires extending around the ring.

In any of the aspects described herein or combinations of the aspects, the wires may be enclosed by the ring.

In any of the aspects described herein or combinations of the aspects, the compressor may further include a strut coupled to the ring and a housing of the air intake duct.

In any of the aspects described herein or combinations of the aspects, an electric conduit may extend through the strut and is coupled to the stator electrics.

In any of the aspects described herein or combinations of the aspects, the strut may extend through a section of the intake air duct.

In any of the aspects described herein or combinations of the aspects, the strut may include a curved surface on an upstream side of the strut.

In any of the aspects described herein or combinations of the aspects, a controller may be configured to electrically drive the stator electrics to form the air gap.

In any of the aspects described herein or combinations of the aspects, the stator electrics may be configured to be electrically driven by a controller to apply toque to the compressor shaft.

In any of the aspects described herein or combinations of the aspects, the controller may be configured to drive the stator electrics while the compressor shaft is receiving rotational input from a turbine shaft rotational coupled to the compressor shaft.

In any of the aspects described herein or combinations of the aspects, the controller may be configured to drive the stator electrics when the compressor shaft is rotating below a threshold speed.

In any of the aspects described herein or combinations of the aspects, the at least two magnets may be permanent magnets.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and subcombinations of the various systems and configurations, and other features, functions, and/or properties disclosed herein.

The invention claimed is:

1. A compressor for an internal combustion engine comprising:
 a compressor shaft which is provided with compressor blades positioned in an intake air duct, the compressor shaft and compressor blades configured to rotate about an axis of rotation; and
 a magnetic bearing positioned upstream of the compressor blades in the intake air duct, the magnetic bearing including a ring positioned around the compressor shaft with an air gap between the ring and the compressor shaft, stator electrics arranged in the ring, and at least two magnets mounted within respective magnetic recesses on the compressor shaft, the at least two magnets configured to exert a magnetic force on the stator electrics.

2. The compressor of claim 1, wherein the ring is retained by at least one strut in the intake air duct.

3. The compressor of claim 2, wherein a supply line for the stator electrics is arranged within the at least one strut.

4. The compressor of claim 2, wherein the at least one strut has a drop-shaped cross-section.

5. The compressor of claim 1, wherein the compressor shaft is connected to a turbine shaft of an exhaust gas turbine such that torque is transmitted from the turbine shaft to the compressor shaft.

6. The compressor of claim 1, wherein the at least two magnets and the stator electrics are configured to repel one another via magnetic forces.

7. The compressor of claim 1, wherein the magnetic bearing is formed as an electric motor.

8. A compressor comprising:
a compressor shaft having compressor blades and positioned in an intake air duct;
a magnetic bearing positioned upstream of the compressor blades in the duct, including a ring positioned around the compressor shaft, stator electrics arranged in the ring, and at least two magnets arranged on the compressor shaft configured to exert a magnetic force on the stator electrics to form an air gap between the ring and the compressor shaft; and
a strut coupled to the ring and a housing of the intake air duct;
wherein the strut includes a curved surface on an upstream side of the strut and a second curved surface on a downstream side of the strut, and the strut tapers in the downstream direction, the upstream side and the downstream side in a direction of air flow; and
wherein the strut includes one or more electrical conduits for coupling the stator electrics with a controller.

9. The compressor of claim 8, where the stator electrics include wires extending around the ring.

10. The compressor of claim 9, where the wires are enclosed by the ring.

11. The compressor of claim 8, where the one or more electric conduits extend through the strut.

12. The compressor of claim 8, where the strut extends through a section of the intake air duct.

13. The compressor of claim 8, where the controller is configured to electrically drive the stator electrics to form the air gap.

14. The compressor of claim 8, where the stator electrics are configured to be electrically driven by the controller to apply torque to the compressor shaft.

15. The compress of claim 14, where the controller is configured to drive the stator electrics while the compressor shaft is receiving rotational input from a turbine shaft rotationally coupled to the compressor shaft.

16. The compressor of claim 14, where the controller is configured to drive the stator electrics when the compressor shaft is rotating below a threshold speed.

17. The compressor of claim 8, where the at least two magnets are permanent magnets.

18. A motor vehicle comprising:
an internal combustion engine;
a supply air branch providing intake air to the internal combustion engine; and
a compressor arranged in the supply air branch, the compressor including:
a compressor shaft which is provided with compressor blades positioned in an intake air duct, the compressor shaft and compressor blades configured to rotate about an axis of rotation;
a magnetic bearing positioned upstream of the compressor blades in the intake air duct, the magnetic bearing including a ring positioned around the compressor shaft with an air gap between the ring and the compressor shaft, stator electrics arranged in the ring, and at least two magnets mounted within respective magnetic recesses on the compressor shaft, the at least two magnets configured to exert a magnetic force on the stator electrics; and
a strut coupled to the ring and a housing of the intake air duct, the strut including a curved surface on an upstream side and a second curved surface on a downstream side, the upstream side and the downstream side in a direction of air flow in the intake air duct.

* * * * *